G. A. HAZELRIGG.
CIDER PRESS.
APPLICATION FILED JUNE 7, 1909.

952,736.

Patented Mar. 22, 1910.

Witnesses
L. D. B. Brown.
C. H. Griesbauer.

Inventor
G. A. Hazelrigg,
by H. B. Willson & Co.
Attorneys

ANDREW B. GRAHAM CO., PHOTO-LITHOGRAPHERS, WASHINGTON, D. C.

UNITED STATES PATENT OFFICE.

GEORGE A. HAZELRIGG, OF WINCHESTER, ILLINOIS.

CIDER-PRESS.

952,736.

Specification of Letters Patent.   Patented Mar. 22, 1910.

Application filed June 7, 1909.   Serial No. 500,708.

*To all whom it may concern:*

Be it known that I, GEORGE A. HAZELRIGG, a citizen of the United States, residing at Winchester, in the county of Scott and State of Illinois, have invented certain new and useful Improvements in Cider-Presses; and I do declare the following to be a full, clear, and exact description of the invention, such as will enable others skilled in the art to which it appertains to make and use the same.

This invention relates to new and useful improvements in cider presses, and has for its object to provide a device of this kind which will be exceedingly simple in construction and very easily operated.

With this and other objects in view, the invention consists of certain novel features of construction, combination and arrangement of parts, as will be more fully described and particularly pointed out in the appended claims.

Figure 1:
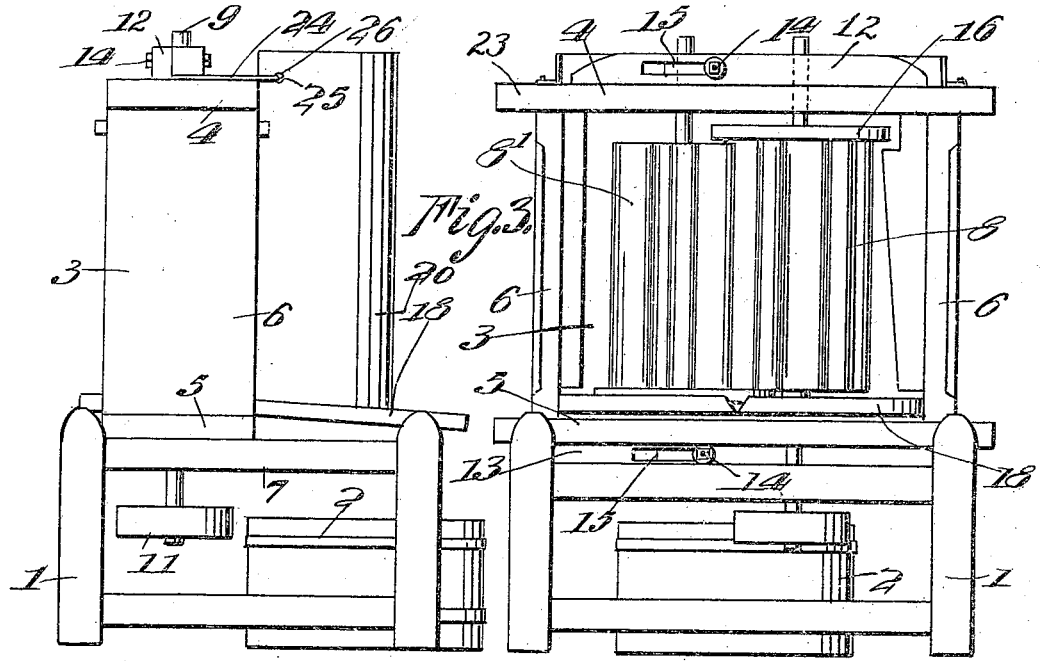
Figure 2:
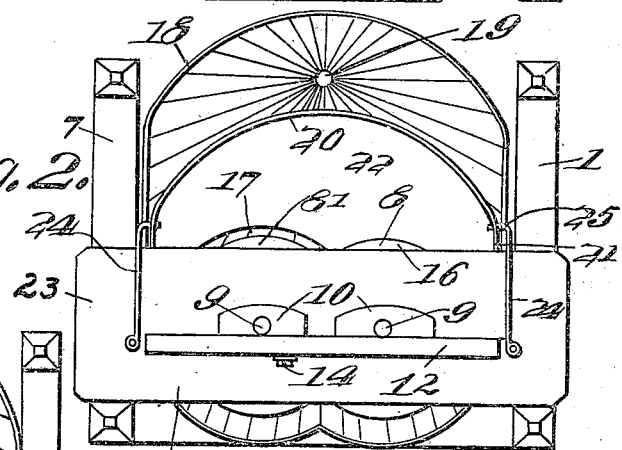
Figure 4:
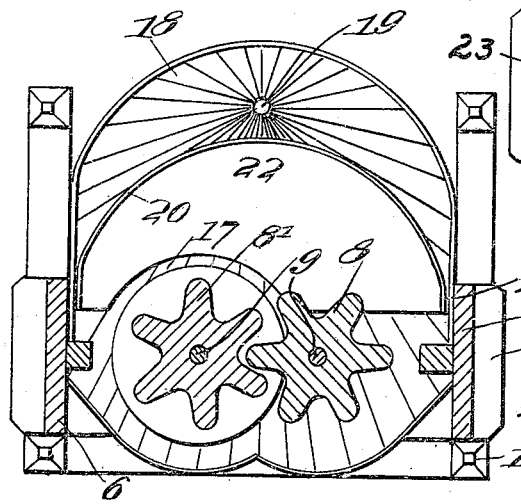

In the accompanying drawings: Figure 1 is a side elevation of a press embodying my improvements. Fig. 2, is a top plan view thereof. Fig. 3, is a back view; and Fig. 4 is a horizontal section taken through the crushing rollers.

Referring to the drawings for a more particular description of the invention, the numeral 1 indicates the supporting frame, which is of approximately rectangular form, and is open at the front to provide for the reception of the pan or receptacle 2, for collecting the juices. An upright open roller supporting frame 3, comprising the top, bottom, and end pieces, 4, 5, and 6, respectively, is mounted upon the upper cross pieces 7, of the frame 1, in which is revolubly mounted a pair of corresponding vertically disposed crushing rollers 8 and 8′, which intermesh with each other. These rollers are fixedly mounted upon the shafts 9, which extend through the top and bottom pieces 4 and 5, of the frame 3, and through the bearings 10. The shaft of the crushing roller 8, extends below the bottom piece 5, of the frame 3, and is provided with the pulley 11, by means of which it is driven. The bearings for the shaft of the roller 8′, are adjustably mounted upon the front faces of the ribs or flanges 12 and 13, by the bolts 14, which extend through said bearings and through longitudinal slots 15, formed in said flanges. By this construction, the adjustable roller 8′, may be brought nearly to or farther away from the stationary roller 8, depending upon the kind of fruit which is to be crushed. The upper end of the roller 8, is provided with the annular flange 16, while the lower end of the adjustable roller 8′ is provided with a similar flange 17, which prevents the fruit from passing out at the upper or lower ends of these rollers and causes all of the fruit to pass between the rollers.

A flat plate 18, is mounted upon the bottom piece of the frame 3, beneath the crushing rollers to collect the juices, said plate being corrugated as shown, and provided with the discharge port 19, at the front thereof through which the juices pass or flow to the pan or receptacle 2. A hopper 20, closes in the front side of the frame 3, and covers the crushing rollers, said hopper being provided at opposite end edges with the flat portions 21, and which fit against the inner faces of the end pieces 6, of the frame 3, and have their upper edges recessed to receive the front edge of the top piece 4, of said frame. This hopper is also provided with a flat base 22, which is recessed at one side, as at 23, to receive the flange of the adjustable crushing roller. This hopper is held in removable position by the keepers 24, which are pivoted to the top piece 23, and are provided at their free end with the hooks 25, which engage apertures 26, in the hopper.

In practice, the apples or other fruit are placed in the hopper and the crushing rollers driven by means of the pulley 11, the fruit passing between the crushing rollers and the juices being collected by the pan 18, and discharged into the receptacle 2. The crushed fruit or pulp falls from between the rollers at the rear side. If desired, a suitable conveyer may be arranged to carry off the pulp as fast as it accumulates.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:

1. In a press of the class described, comprising a main supporting frame, a secondary upright supporting frame mounted thereon, a pair of vertically disposed crushing rollers mounted in said upright frame, a discharge pan arranged beneath the rollers, and a hopper removably mounted upon said pan in front of the rollers.

2. In a press of the class described, comprising a main supporting frame, a secondary upright supporting frame mounted thereon, a pair of vertically disposed crushing rollers mounted in said upright frame, a discharge pan arranged beneath the rollers, a hopper removably mounted upon said pan in front of the rollers, keepers pivoted to the upright frame for holding the hopper in removable position, and means for adjusting one of the crushing rollers toward or away from the other roller.

3. In a device of the class described, comprising a main supporting frame, a secondary upright frame mounted thereon, a drip pan mounted in said secondary frame, a stationary vertically disposed crushing roller mounted in said upright frame above said drip pan, a second similar crushing roller adjustably mounted in said frame, a hopper mounted on the drip pan in front of the rollers, and keepers pivoted to the upright frame for holding the hopper in removable position.

In testimony whereof I have hereunto set my hand in presence of two subscribing witnesses.

GEORGE A. HAZELRIGG

Witnesses:
 THOMAS DRAKE,
 THOS. J. PRIEST.